US008665725B2

(12) United States Patent
Kwan et al.

(10) Patent No.: US 8,665,725 B2
(45) Date of Patent: Mar. 4, 2014

(54) SYSTEM AND METHOD FOR HIERARCHICAL ADAPTIVE DYNAMIC EGRESS PORT AND QUEUE BUFFER MANAGEMENT

(75) Inventors: Bruce Kwan, Sunnyvale, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 27 days.

(21) Appl. No.: 13/523,994

(22) Filed: Jun. 15, 2012

(65) Prior Publication Data

US 2013/0155859 A1 Jun. 20, 2013

Related U.S. Application Data

(60) Provisional application No. 61/577,702, filed on Dec. 20, 2011.

(51) Int. Cl.
*H04L 12/28* (2006.01)
*H04L 12/56* (2011.01)
*G06F 3/00* (2006.01)
*G06F 5/00* (2006.01)

(52) U.S. Cl.
USPC ........... 370/235; 370/229; 370/252; 370/412; 710/29; 710/52

(58) Field of Classification Search
USPC ................. 370/229, 230, 231, 235, 412, 252; 710/29, 52
See application file for complete search history.

(56) References Cited

U.S. PATENT DOCUMENTS

| | | | |
|---|---|---|---|
| 6,535,484 B1 | 3/2003 | Hughes et al. | |
| 6,657,955 B1 * | 12/2003 | Bonneau et al. | 370/229 |
| 7,743,108 B2 * | 6/2010 | Brown | 709/213 |
| 7,948,880 B2 | 5/2011 | Kwan et al. | |
| 2005/0147095 A1 * | 7/2005 | Guerrero et al. | 370/390 |
| 2008/0022016 A1 | 1/2008 | Tripathi et al. | |
| 2009/0010162 A1 | 1/2009 | Bergamasco et al. | |

FOREIGN PATENT DOCUMENTS

CA 2273291 A1 11/2000

OTHER PUBLICATIONS

Hahne et al., "Dynamic Queue Length Thresholds for Multiple Loss Priorities," IEEE/ACM Transactions on Networking, vol. 10, No. 3, Jun. 2002.
Choudhury et al., "Dynamic Queue Length Thresholds for Shared-Memory Packet Switches," IEEE/ACM Transactions on Networking, vol. 6, No. , Apr. 1998.
EP Search Report, Dec. 2012.

* cited by examiner

*Primary Examiner* — Alpus H Hsu
*Assistant Examiner* — Dharmesh Patel
(74) *Attorney, Agent, or Firm* — Duane S. Kobayashi

(57) ABSTRACT

A system and method for hierarchical adaptive dynamic egress port and queue buffer management. Efficient utilization of buffering resources in a commodity shared memory buffer switch is key to minimizing packet loss. Efficient utilization of buffering resources is enabled through adaptive queue limits that are derived from an adaptive port limit.

8 Claims, 3 Drawing Sheets

SYSTEM AND METHOD FOR HIERARCHICAL ADAPTIVE DYNAMIC EGRESS PORT AND QUEUE BUFFER MANAGEMENT

This application claims priority to provisional patent application No. 61/577,702, filed Dec. 20, 2011, which is incorporated by reference herein, in its entirety, for all purposes.

BACKGROUND

1. Field of the Invention

The present invention relates generally to network switches and, more particularly, to a system and method for hierarchical adaptive dynamic egress port and queue buffer management.

2. Introduction

Increasing demands are being placed upon the data communications infrastructure. In commodity shared memory on-chip buffer switch designs, efficient utilization of buffering resources is a key factor in minimizing frame loss. When a capacity of a packet buffer in a switch is exceeded, the packet buffer can back up and packet loss can occur. As would be appreciated, such packet loss can significantly impact overall application behavior.

A trend in today's network devices is the growing number of queues per port. This can result, for example, by the increasing use of virtualization in the network infrastructure. This rise in the number of queues per port places increasing demands on the traffic management capabilities that can determine the potential for packet losses.

For some classes of traffic, packet loss can produce little to no impact on network services and applications. In datacenter applications, however, packet loss can be unacceptable. What is needed therefore is a mechanism that enables hierarchical adaptive dynamic egress port and queue buffer management.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

As noted, many of today's switches have designed configurations that have the potential for entering into an oversubscribed condition. This is a result of high bandwidth I/O ports (e.g., 10 GbE) that in combination can exceed the packet processing capabilities of the switch.

Figure 1:
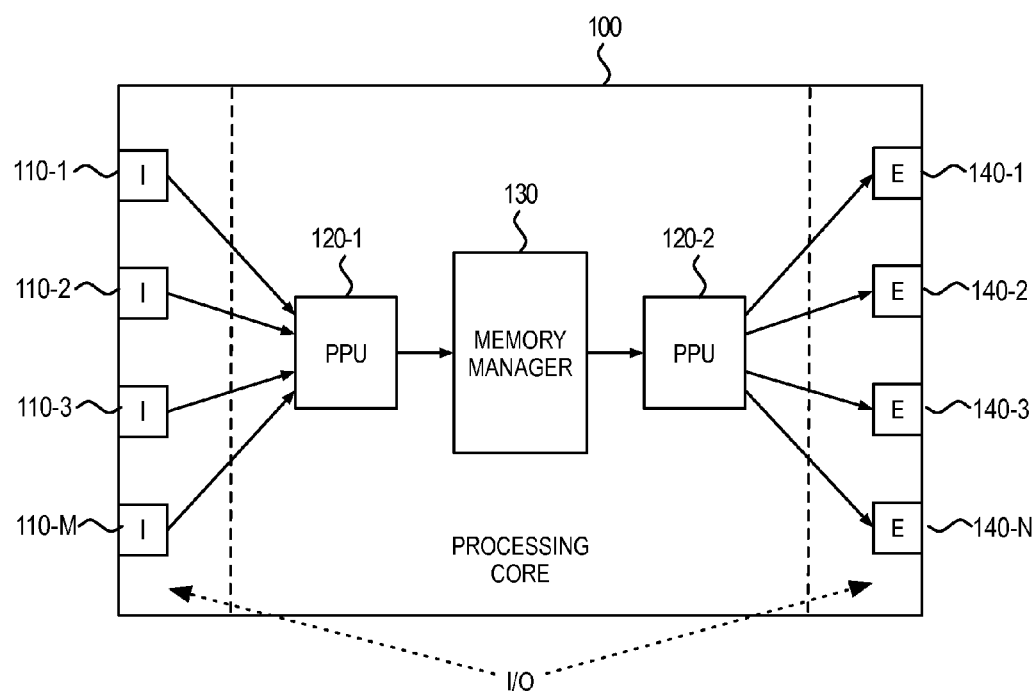
FIG. 1 illustrates an example embodiment of a general switch.

FIG. 1 illustrates an example embodiment of a switch. As illustrated, switch 100 includes a plurality of ingress ports 110-1 to 110-4, each of which can provide connectivity to other network devices. As an example, each of ingress ports 110-1 to 110-4 can provide 10 GbE connectivity to other switches in a data center. Similarly, switch 100 includes a plurality of egress ports 140-1 to 140-4, each of which can provide connectivity to other network devices (e.g., servers).

As illustrated, ingress ports 110-1 to 110-M and egress ports 140-1 to 140-N are included as part of the I/O portion of switch 100. The I/O portion of switch 100 is shown as being logically distinct from the processing core of switch 100. As illustrated, the processing core of switch 100 includes packet processing units 120-1, 120-2 and memory manager 130. In one embodiment, packet processing units 120-1, 120-2 execute real-time operations on packets, such as framing/parsing, classification, traffic policing and shaping, modification, compression/encryption, queueing, etc. Control operations such as translation, route calculation, routing table updates, etc. can also be performed by packet processing units 120-1, 120-2. As would be appreciated, the specific configuration of the processing core of the switch is implementation dependent.

In one embodiment, switch 100 can be embodied as a shared memory buffer switch. In one application, the switch can be included in a blade switch product, where the switch acts in a top-of-rack (TOR) role. In this configuration, the switch can connect to the network via two 40 G links in providing a redundant spanning tree protocol (STP) topology. The blade switch product can also include a plurality of servers that can connect to the TOR switch via 10 G links. In one configuration, The shared memory TOR switch shares a shallow memory buffer (e.g., 2-12 MB).

Figure 2:
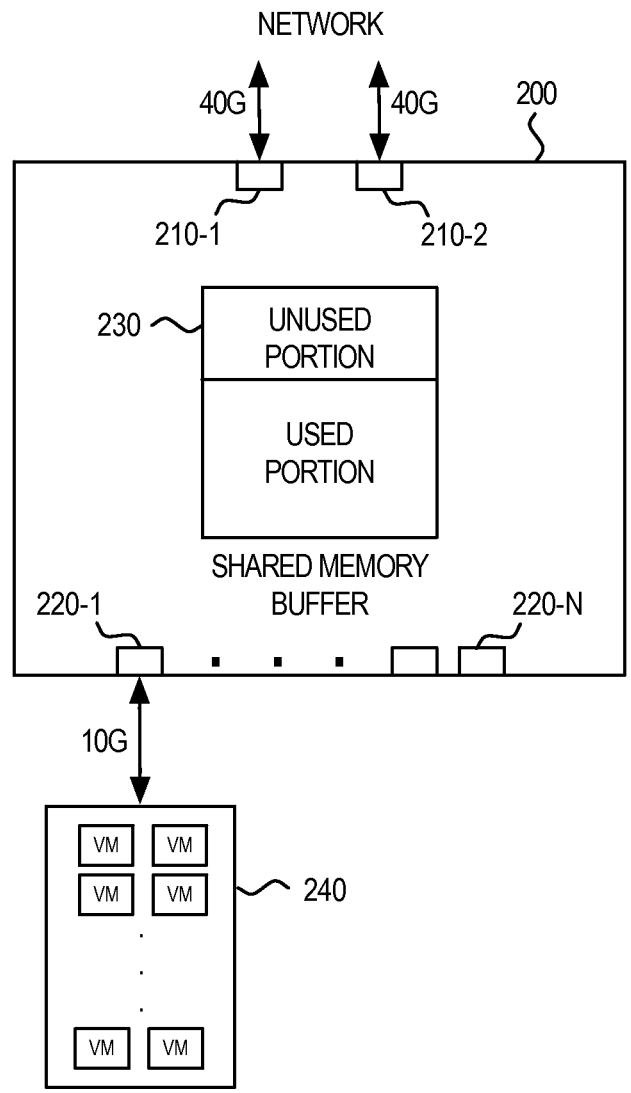
FIG. 2 illustrates an example configuration of a shared memory switch in a blade switch product.

FIG. 2 illustrates an example of such a blade switch configuration. As illustrated, shared memory buffer switch 200 is coupled to the network via external 40 G ports 210-1, 210-2 that provide a redundant STP configuration. Switch 200 also includes a plurality of internal ports 220-1 to 220-N that enable coupling of switch 200 to a plurality of servers in the blade switch product. For simplicity, FIG. 2 illustrates only a single connection of internal port 220-1 to server 240.

As noted, one of the challenges of a switch meeting the needs of today's network environments is the growing number of queues per port. Conventionally, a plurality of queues on a port could be defined to support a corresponding plurality of traffic classes of service. As an example, a single server can have eight different queues that support eight different traffic classes.

With the increasing use of virtualization in the network infrastructure, a significant rise in the number of queues per port has occurred. As illustrated, in FIG. 2, server 240 can be designed to support a plurality of virtual machines (VMs). Each of these VMs can support their own set of queues. Thus, for example, if server 240 has 10 VMs, with each VM supporting eight different queues, then the total number of queues on port 220-1 would be 10 VMs*8 queues/VM=80 total queues. Supporting this number of queues on a single port places increasing demands on the traffic management capabilities of switch 200. The failure of switch 200 in properly managing the traffic on ports 220-1 to 220-N can lead to significant instances of packet loss.

For a commodity switch that has a shallow memory buffer, proper allocation of the shared memory buffer is a key component in proper traffic management. In general, a shared memory switch can use logically common packet buffers that are available to all switch ports. Packets arriving on a port are stored in a high-speed, multi-port memory that is shared by all of the switch ports. Memory from the shared memory buffer is dynamically allocated to a packet by the memory manager using a scheduling process that attempts to give each port as much memory as it needs. Unfairness can be prevented by the memory manager through the dynamic adjustment of the maximum amount of memory that is assigned to any one switch port. If a packet is to be queued for an egress port, but the egress port has hit its maximum memory allocation, then the packet would be dropped.

In the present invention, it is recognized that while adaptive queue limits can work reasonably well when the number of queues per port are limited, its effectiveness diminishes as the number of queues per port increases. More specifically, as the number of queues per port increases, the static port limits begin to have a greater impact on the system. The impact of the adaptive queue limits would then diminish in comparison. The end result is that supporting port isolation along with many queues per port can result in packets being dropped by the switch.

It is a feature of the present invention that a switch device can be provided that is configurable in enabling per port isolation while also supporting per queue dynamic threshold limits. The dynamic threshold mechanism of the present invention is based on the amount of buffer space available in the shared memory buffer. As illustrated in the example of FIG. 2, shared memory buffer 230 includes a used portion and an unused portion. The unused portion of the shared memory buffer represents the memory space that is available for allocation to the various queues on the egress ports.

Conventionally, static port limits have been used to provide a measure of isolation between the various ports. As noted above, these static port limits become increasingly dominant in impact as the number of queues on a port increase. As such, the static port limits begin to diminish the impact of the adaptive limits that may be implemented by the queues on the port.

In the present invention, adaptive port limits are provided for the ports. These adaptive port limits are based on the unused portion of the shared memory buffer. In one embodiment, the port limit (PL) for an egress port is determined as PL=BAF*R, where BAF is a defined burst absorption factor and R is the unused remainder of the shared memory buffer. In one example, BAF is less than or equal to 1. As would be appreciated, such an example is not intended to be limiting. In general, the burst absorption factor can be used to determine an adaptive port limit that can be adjusted relative to the unused remainder of the shared memory buffer to enable different levels of burst absorption.

It is a feature of the present invention that the adaptive port limit (PL=BAF*R) can also be used to enable adaptive queue limits. In one embodiment, the adaptive queue limits for a port are determined based on the determined adaptive port limit for that particular port. More specifically, the queue limits for the queues on a port M can be defined as $QL_i = \alpha_i * PL_M$, where $\alpha$ is a variable (<1) that can be specified for each queue. In one embodiment, the fractional variable a can also be specified for a group of queues. In yet another embodiment, the factional variable a can be specified for an individual virtual machine. In this embodiment, a virtual machine limit (VML) can be defined where queue limits for the queues on a virtual machine N can be defined as $QL_i = \beta_i * VML_N$, where $\beta$ is a variable (<1) that can be specified for each queue. Again, in this embodiment, the fractional variable $\beta$ can also be specified for a group of queues on that particular virtual machine.

As has been described, port isolation can be achieved with adaptive burst absorption while also providing fair access to the available buffer for each of the queues for a port. In this manner, the adaptive dynamic thresholds that can be applied to the increased number of queues on a port would not diminish in effectiveness because static port limits have been eliminated.

Figure 3:
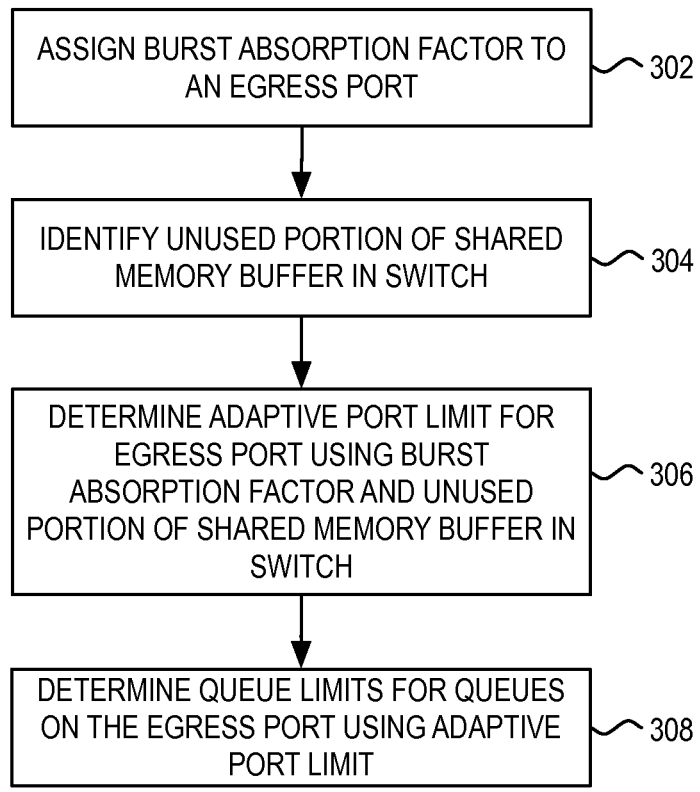
FIG. 3 illustrates a flowchart of a process of the present invention.

Having described a mechanism for enabling port isolation with adaptive per queue dynamic threshold limits, reference is now made to FIG. 3, which illustrates an overview of a process of the present invention. As illustrated, the process begins at step 302 where a burst absorption factor is assigned to an egress port. As the burst absorption factor is used to determine a port limit, the burst absorption factor can be static or dynamic across all of the egress ports depending on the type of port isolation desired.

Next, at step 304, the unused portion of the shared memory buffer in the switch is identified. As described above, this identification of the unused portion of the shared memory buffer provides an adaptive dynamic mechanism to the determination of the port limits. This is in contrast to conventional static port limits that have been known to dominate the impact of adaptive queue limits when the number of queues on a port increases substantially.

At step 306, a port limit for a particular port is determined using the assigned burst absorption factor and the unused remainder of the shared memory buffer. Here, the determination of an adaptive port limit can be performed using an example calculation of PL=BAF*R. Once the adaptive port limit is established, the adaptive queue limits for the queues on the egress port can then be determined using the adaptive port limit.

As noted above, various mechanism can be used to determine adaptive queue limits. In various examples, the adaptive queue limits can be determined based on individually-assigned variables, group-assigned variable, virtual machine specific variables, etc.

Here, it is significant that the adaptive queue limits are derived from a port limit that is designed in itself to be adaptively dynamic. The result of such a derivation is adaptive queue limits that are not limited by static port limits.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A switch that enables dynamic queue threshold limits, comprising:
   a shared memory buffer;
   a plurality of ports, a first of said plurality of ports being coupled to a network device having a plurality of virtual machines, wherein each of said plurality of virtual machines has a plurality of queues that are associated with a plurality of traffic classes; and
   a processing core that determines a virtual machine limit for each of said plurality of virtual machines, wherein a first virtual machine limit for a first of said plurality of virtual machines is determined as a fraction of a port limit for said first of said plurality of ports, said port limit for said first of said plurality of ports being determined by multiplying an unused remainder of said shared memory buffer by a burst absorption factor assigned to said first of said plurality of ports, said burst absorption factor having a value that is less than one, wherein an application of said value of said burst absorption factor to said unused remainder of said shared memory buffer creates an adaptive port limit that has a value that adjusts based on said unused remainder of said shared memory buffer, said processing core further determining queue limits for each of a plurality of queues associated with said first of said plurality of virtual machines, said queue limits for each of said plurality of queues associated with said first of said plurality of virtual machines representing a fraction of said first virtual machine limit for said first of said plurality of virtual machines.

2. The system of claim 1, wherein said plurality of queues on said first of said plurality of virtual machines shares an assigned percentage of said port limit.

3. The system of claim 2, wherein each of said plurality of queues on said first of said plurality of virtual machines is assigned a fraction of said assigned percentage of said first virtual machine limit.

4. A dynamic queue threshold limit method, comprising:
   assigning a burst absorption factor to a port on a switch, said port being coupled to a network device via a network communication cable, said burst absorption factor having a value that is less than one;
   identifying an amount of an unused portion of a shared memory buffer in said switch;
   determining a port limit for said port by multiplying said burst absorption factor assigned to said port by said identified amount of said unused portion of said shared memory buffer, wherein an application of said value of said burst absorption factor to said identified amount of said unused portion of said shared memory buffer creates an adaptive port limit that has a value that adjusts based on said identified amount of said unused portion of said shared memory buffer;
   determining a virtual machine limit for a virtual machine on said network device, said virtual machine limit representing a fraction of said determined port limit; and
   determining a queue limit for each of a plurality of queues associated with said virtual machine on said network device, wherein each of said assigned queue limits are fractions of said determined virtual machine limit.

5. The switch of claim 1, wherein said processing core includes one or more packet processing units and a memory manager.

6. The switch of claim 1, wherein said switch is part of a blade switch product.

7. The switch of claim 1, wherein said fraction of said first virtual machine limit for said first of said plurality of virtual machines is based on a variable that is less than one.

8. The method of claim 4, wherein said fractions of said determined virtual machine limit are based on one or more variables that are less than one.

* * * * *

UNITED STATES PATENT AND TRADEMARK OFFICE
CERTIFICATE OF CORRECTION

| | | |
|---|---|---|
| PATENT NO. | : 8,665,725 B2 | Page 1 of 1 |
| APPLICATION NO. | : 13/523994 | |
| DATED | : March 4, 2014 | |
| INVENTOR(S) | : Kwan et al. | |

It is certified that error appears in the above-identified patent and that said Letters Patent is hereby corrected as shown below:

In the Claims

Claim 2, Col. 5, line 33, replace "system" with --switch--.

Claim 3, Col. 5, line 36, replace "system" with --switch--.

Signed and Sealed this
Twenty-fourth Day of June, 2014

Michelle K. Lee
*Deputy Director of the United States Patent and Trademark Office*